United States Patent Office 3,699,061
Patented Oct. 17, 1972

3,699,061
COATING COMPOSITION CONTAINING URETHAN-MODIFIED EPOXIDIZED ESTER AND POLYCARBOXYLIC ACID MATERIAL
Arthur L. Cunningham, Park Forest, Ill., assignor to The Sherwin-Williams Company, Cleveland, Ohio
No Drawing. Filed Feb. 22, 1971, Ser. No. 117,684
Int. Cl. C08g 45/12
U.S. Cl. 260—18 PT         8 Claims

ABSTRACT OF THE DISCLOSURE

A resin suitable for making a two-package coating system includes a component vehicle comprising an epoxidized fatty acid ester partially reacted with a monocarboxylic alcohol and further reacted with a polyisocyanate to form a prepolymer material. In a two-package coating system, a polycarboxylic curing agent is admixed with the urethan-modified epoxidized ester for curing the resin by reaction of the carboxyl groups with residual oxirane groups. Hard tack-free films are achieved within a short period at ambient temperature. This resin is especially adapted for making protective and decorative coatings, either clear or pigmented.

BACKGROUND OF THE INVENTION

Cured resins made by reacting epoxide compounds and polymers with a variety of materials containing carboxylic acid groups have achieved considerable success as casting resins, potting compounds, vehicles for paints and varnishes, and laminating compositions. These polymers are advantageous in that they can usually be cured at room temperature in the presence of air. Of special interest to persons working in the field of protective and decorative coatings are those resins produced from epoxidized oils such as soya oils. These materials are usually the product of a commercial epoxidation process wherein an ester of an unsaturated fatty acid and a polyhydric alcohol is treated with a peracid to form an internal oxirane ring at the points of ethylenic unsaturation inside the long aliphatic chain of the fatty acid moiety of the ester. Because this epoxidized material can be manufactured using natural trigylceride oils from animal and vegetable sources, they are relatively inexpensive and available in large supply. Resins can be made from these materials having low color, good durability and other desirable properties. Compared to the polyepoxide resins with terminal oxirane groups (e.g., glycidyl polyethers of polyhydric phenols), these epoxidized materials having internal oxirane rings are less reactive, which sometimes poses a problem for obtaining acceptable cure times or in achieving a high degree of crosslinking through the oxirane-carboxyl reaction.

SUMMARY OF THE INVENTION

A novel urethan-modified epoxidized ester prepolymer material has been found which is especially useful in a two-package coating system with a polycarboxylic curing agent, with or without a catalyst. The urethan-modified epoxidized ester comprises a curable liquid prepolymeric composition consisting essentially of the partial reaction product of an epoxidized ester of a polyol with $C_{12}$–$C_{22}$ aliphatic acids containing an average of about 2–6 internal oxirane groups per ester molecule with a monocarboxylic aliphatic alcohol to produce a hydroxy-modified intermediate ester having at least one unreacted oxirane group per ester molecule; and wherein the hydroxy-modified intermediate is further reacted with a polyisocyanate. The urethan-modified epoxidized ester can be made from triglyceride oils of unsaturated fatty acids and the urethan-modified prepolymeric product preferably contains about 3 to 7% oxirane oxygen. Polycarboxylic curing agents, such as the esterification product of a polyol with a carboxylic acid anhydride can be mixed with the urethan-modified prepolymers to produce coating systems for protective and decorative use, casting resins, potting compounds, adhesives, etc.

Accordingly it is an object of this invention to provide a novel process and composition for curing epoxidized materials with polycarboxylic acid curing agents. It is a further object of this invention to provide prepolymeric materials having reactive internal oxirane groups for crosslinking by polycarboxylic acids. Another object of this invention is to provide a process for making coatings including the steps of reacting an epoxidized fatty acid ester with a stoichiometric deficiency of a mono-carboxylic acid having one or more alcohol groups and further modifying this polyester condensation product with a polyisocyanate to produce a low molecular weight oligomer. This low molecular weight oxirane-containing component can be cured in a short time by admixing with a polycarboxylic material. These and other objects and advantages of the invention will be understood by referring to the following description and examples.

DESCRIPTION

The principal reactions involved in making resins according to this invention are (A) the carboxyl-oxirane reactions and (B) the isocyanate-hydroxyl reactions. Reaction A proceeds as follows:

where R is a carboxylic acid residue leaving at least one hydroxyl group.

Reaction B proceeds as follows:

where R' is an organic isocyanate residue, and R" is a residue of hydroxy-modified epoxidized fatty ester. In reaction A each oxirane ring produces a free hydroxyl group by cleavage of the ring structure and additional free hydroxyl groups are added to the ester molecule by the carboxylic residue. In the case of the reaction between an oxirane group and a monocarboxylic dihydric alcohol (e.g., 2,2-dimethylol propionic acid), three free hydroxyl groups result from the reaction. The carboxyl groups also effect cleavage of additional oxirane groups by their catalytic influence, to the extent that there is any water present to hydrolyze them. Under normal conditions this catalytic hydrolysis may cause from 10 to 20% additional oxirane to be hydrolyzed to the resultant dihydroxyl product. Any or all of these free hydroxyl groups may be reacted with an organic isocyanate such as toluene diisocyanate. Two or more intermediate hydroxy-modified ester molecules may be joined through the isocyanate reaction, depending upon the functionality of the monomeric materials. Reaction A and B can be carried out in the presence of a solvent or a solvent-free reaction can be used. Reaction A can be run at a temperature of about 120 to 180° C., and Reaction B at about 70 to 120° C. The prepolymeric reaction product is preferably of low molecular weight and is soluble in numerous organic liquids. A two-package coating system can be formulated with the reactive urethan-modified epoxidized ester prepolymer or oligomer in one package and a polycarboxylic curing agent in a separate second package.

THE EPOXIDIZED ESTERS

The starting ester materials from which the urethan-modified epoxidized prepolymers are made can be from a variety of sources. It is preferred that naturally occurring oils such as semi-drying or drying oils of vegetable, animal or marine origin be used because of their availability and low cost. Such oils include the triglyceride esters of unsaturated fatty acids having about 12 to 22 carbon atoms in the acid chain. These natural oils are epoxidized by known methods, such as described in U.S. Patent 2,801,253, wherein internal olefinic unsaturation present in the fatty acid moiety is oxidized to form two or more oxirane rings per ester molecule. In the practice of this invention, the oxirane rings are internally located within the fatty acid chain, and the ring carbons are joined to at least one other adjacent carbon atom; e.g.,

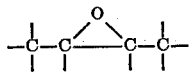

There is no substantial reaction detected between isocyanate groups and internal oxirane groups in the usual practice of this invention. The preferred epoxidized oils contain an average of about 2 to 6 internal oxirane groups per ester molecule. For most triglyceride esters of fatty acids, this amounts to about 3% to 10% by weight oxirane content.

As examples of unsaturated natural oils which may become a part of the epoxidized material, the following may be used: soybean oil, linseed, tung, cotton seed, safflower, sunflower, oiticica, tall oils, dehydrated castor oils, and various fish oils, such as menhaden, cod, or shark. Also, the desired ester can be synthesized by esterification reaction between a polyol and unsaturated fatty acids or epoxidized fatty acids. The polyols suitable for esterification include the $C_2$–$C_8$ aliphatic alcohols, such as ethylene glycol, glycerol, pentaerythritol, trimethylol propane, polyhydric ethers, etc.

Fatty acids suitable for esterification and epoxidation include dodecylenic, palmitoleic, oleic, linoleic, linolenic, eleostearic, gadoleic and erucic. Minor amounts of saturated acids may be present if they do not interfere with the curing of the epoxidized material.

THE HYDROXYL MODIFICATIONS

The general purpose of the hydroxyl modification of the epoxidized esters is to increase the functionality of the esters for forming prepolymers or oligomers. To achieve this increase in functionality, up to half the internal oxirane groups are reacted with carboxyl compounds containing hydroxy groups. This intermediate product results in an isocyanate-reactive ester. The ratio of carboxyl to oxirane varies with respect to the initial oxirane content, but generally the amount of hydroxy-containing carboxylic acid is sufficient to consume from 5% to 50% of the internal oxirane groups.

The hydroxyl-modifying reactant is a low molecular weight aliphatic monocarboxylic acid containing one or more hydroxyl groups, such as dimethylol propionic acid (DMPA). Other satisfactory materials include monohydroxy-monocarboxylic acids such as glycolic acid, lactic acid, hydracrylic acid, ricinoleic acid, 12-hydroxystearic acid or 3-hydroxybutanoic acid; dihydroxy acids such as mevalonic acid, 9,10-dihydroxystearic acid, or glyceric acid; and polyhydroxy acids such as arythric acid or aleuritic acid. Other suitable hydroxy acids are described in U.S. Patents 3,404,018 and 3,449,385. Various acids containing hydroxyl groups can be mixed to produce an intermediate for isocyanate reaction. It is preferred to have as the major amount of the monocarboxylic alcohol reactant at least one aliphatic alcohol having 1,2-primary or secondary hydroxyl groups and having a molecular weight of about 75 to 500. Also, minor amounts of acids having no hydroxyl group can be used in combination with alcohol acids if the average hydroxyl content is sufficient to produce more hydroxyl groups than the oxirane groups consumed by the acid reaction. These hydroxylating materials should be essentially monocarboxylic in order to prevent gelling of the epoxidized esters.

The hydroxy modified intermediate esters have at least one unreacted internal oxirane group per ester molecule contained in the $C_{12}$–$C_{22}$ fatty acid moiety.

THE URETHAN MODIFICATION

The hydroxy-modified epoxidized esters are further reacted with an organic polyisocyanate in an amount sufficient to provide a ratio of NCO:OH of about 0.2:1 to 4:1, preferably about 1.3:1 to 1.8:1. The isocyanate monomers useful for this reaction include the aliphatic, cycloaliphatic and benzenoid polyisocyanates, such as toluene 2,4-diisocyanate (TDI) m-tolylene diisocyanate, xylylene diisocyanate toluene triisocyanate, phenylene diisocyanates, halogenated benzenoid polyisocyanates, naphthalene triisocyanate, hexamethylene diisocyanate and cyclohexylene diisocyanate.

THE POLYCARBOXYLIC CURING MATERIAL

While the epoxidized esters can be cured by numerous acid materials having an average of at least two carboxyl groups, the preferred curing agents are the partial esters of polyols formed by partial esterification of triols, tetrols or hexols with cyclic acid anhydrides. The preferred polyols for these curing agents are trimethylol ethane, trimethylol propane, glycerol, pentaerythritol, sorbitol and the polypropoxylates or polyethoxylates of the monomeric polyols described. The preferred acid anhydrides for esterifying these polyols are phthalic anhydride, trimellitic anhydride, or chlorendic anhydride (1,4,5,6,7,7-hexachloroendomethylenetetrahydrophthalic anhydride).

Polymeric polyols formed from the condensation of a large excess of polyol with polybasic acid or polyisocyanate also produce useful polyols for partial ester formation. Other materials useful as curing agents include carboxyl end-blocked polyesters and maleinized drying oil alkyds. Acid values for the curing agent are usually in the range of about 60 to 200, based on solids.

The polycarboxylic curing agents can be used with a variety of solvents, including aliphatic and aromatic liquids, alcohols, ethers, ketones and esters.

The following examples are given to demonstrate the concept of the invention. All quantities are given in parts by weight unless otherwise stated.

Example I

A heated glass reaction vessel having a reflux condenser and agitator was charged with 524 parts by weight (0.56 mol) of epoxidized soya oil (ESO), which was a triglyceride ester having about 7 wt. percent internal oxirane oxygen and an average of about 4 oxirane groups per molecule. To the heated oil at 120° C. was added 54 parts (0.4 mol) of 2,2'-dimethylol propionic acid (DMPA). The mixture was reacted at 150° C. for two hours until the acid value was reduced below 1 and the oxirane oxygen was reduced to 4.2%. The mixture was cooled to 30° C. and 244 parts (1.4 mols) of toluene 2,4-diisocyanate (TDI) was added. The mixture was then reacted for 16 hours at 70° C. until the reaction mixture became very viscous. The resin was reduced to 30% solids by addition of ethoxyethyl acetate. The Gardner-Holdt viscosity was $Z_2$. Less than 2% unreacted TDI was found, based on resin solids. The hydroxy modification used a COOH: oxirane ratio of about 0.18:1 and an NCO:OH ratio of about 2.3:1.

Example II

The procedure of Example I was followed except that 27 parts (0.2 mol) of DMPA were added to the ESO at 150° C. and reacted for three hours until the avid value of resin solids fell to 0.45. The reaction mixture was cooled to 90° C. and 115 parts of aliphatic solvent (VM & P naphtha) was added. The temperature was increased to 120° C. over a 15 minute period, while adding 39 parts (0.225 mol) of TDI at a uniform rate. The reaction mixture was held for two hours at 120° C. and the free isocyanate (—NCO) content fell to 1.2%. No free TDI was detected. The resin was thinned to 62% solids with 60 parts of 1-butanol, 85 parts aliphatic solvent and 100 parts ethoxyethyl acetate. This composition had a Gardner-Holdt viscosity of Z and Gardner color of 1. The COOH:oxirane ratio was about 0.09:1 and the NCO:OH ratio was 0.75:1.

The procedure of Example I was followed in Example III below and the procedure of Example II was followed in Examples IV to XIII. The variations from the procedures are tabulated below along with the results of analyses and calculated values.

solids. Where a catalyst was used in the curing, a mixture of 1 part of phosphoric acid per 100 parts of epoxidized oil was employed. The admixture of the epoxidized material with curing agent can be effected manually with a spatula or mecahnically with a motorized blender. A standard drying test was used in which the 60:40 mixture was drawn on a steel panel substrate at a film thickness of about 75 microns (0.003 in.). The drying time is expressed as that time from the casting of the film at ambient temperature (20–25° C.) until a tack-free surface was obtained using the Zapon foil procedure described in ASTM Method D1640–59. These examples are given

| Example Number | Hydroxyacid (parts) | Isocyanate (parts) | NVM/solvent (percent) | Visc. | Color | Oxirane (wt. percent-O) | —NCO (percent) | Free TDI (percent) | COOH/ Oxir. | NCO/ OH |
|---|---|---|---|---|---|---|---|---|---|---|
| III | DMPA (20), benzoic (9) | TDI (135.5) | | T-U | 3 | 4.23 | 5.38 | 1.20 | 0.1 | 3.0 |
| IV | DMPA (20), ricinoleic (22) | TDI (45) | | L | 3 | 4.44 | <.5 | <.5 | 0.1 | 1.5 |
| V | DMPA (20), 12-hydroxystearic (22) | TDI (45) | | F-G | 4 | 4.48 | <.5 | <.5 | 0.1 | 0.9 |
| VI | Glycolic (13.7), 12-hydroxystearic (13.1) | TDI (45) | | F | 3 | 4.24 | <.5 | <.5 | 0.1 | 1.0 |
| VII | DMPA (20), 12-hydroxystearic (22) | Hydrogenated TDI (138) | | J-K | 1-2 | 4.86 | <.5 | <.5 | 0.4 | 2.8 |
| VIII | Ricinoleic (66) | TDI (45) | 76% naphtha (158), butanol (63) | I | 6 | 4.55 | Nil | Nil | 0.09 | 1.24 |
| IX | Glycolic (20) | TDI (30) | 67% naphtha (143), butanol (57) | A | 1+ | 4.63 | Nil | Nil | 0.11 | 0.76 |
| X | Benzoic (122) | TDI (65) | 73% naphtha (178), butanol (71) | | 4 | 0.8 | Nil | Nil | 0.45 | 1.5 |
| XI | DMPA (13.5) | TDI (19.5) | 93% butanol (55.5) | S | 2 | 6.25 | Nil | Nil | 0.05 | 0.85 |
| XII | Ricinoleic (60), benzoic (24) | TDI (52) | 76% naphtha (166), butanol (66) | U-V | 8 | 3.25 | Nil | Nil | 0.18 | 1.2 |
| XIII | DMPA (54)[1] | TDI (52)[2] | 81% | | 3 | | | 0.31 | 0.18 | 0.5 |

[1] 4½ hours.  [2] 2 hours at 40–55° C.

POLYCARBOXYLIC CURING AGENT A

A curing agent was prepared by reacting 1483 parts of chlorendic anhydride (1,4,5,6,7,7-hexachloroendomethylene tetrahydrophthalic anhydride) with 136 parts of pentaerythritol at 150° C. for two hours. The resulting polycarboxylic partial ester was reduced to 60% solids with a solvent consisting of equal parts of xylene and ethoxyethyl acetate. The acid value of the curing agent was 113.

POLYCARBOXYLIC CURING AGENT B

Into a reaction vessel fitted with a condenser and agitator were charged 1966 parts of chlorendic anhydride, 136 parts of pentaerythritol and 330 parts of an alpha-olefin oxide material having 15–18 carbon atoms and an oxygen content of 6.65%. These reactants were slurried in 350 parts of aliphatic naphtha solvent and heated at 120–140° C. for 50–60 minutes. The acid value was 137. This resin was thinned to 61% solids by adding aliphatic naphtha solvent. The viscosity was W-X, color was 2–3 and the resin was clear.

The ratio of urethan-modified component to curing agent depends upon the amount of reactive groups in each. As a general rule, it is desirable to have a slight stoichiometric excess of carboxyl groups, but acceptable films may be produced from blends containing about 50 to 200 parts of urethan-modified material per 100 parts of curing agent, where the components are available as 60% to 80% solids. The preferred weight ratio of resin solids is about 3:2 to 1:2, based on pigment and filler-free non-volatile materials.

The urethan-modified epoxidized oils of Examples I to XII were each cured by reaction with polycarboxylic curing agent A in the amounts to give 60 parts of epoxy component per 40 parts of curing agent, based on resin the same designations as corresponding Examples I-XII, with the subscript A to indicate their admixture with curing agent A.

| Example | I | II | III | IV | V | VI | VII | VIII | IX | X | XI | XII |
|---|---|---|---|---|---|---|---|---|---|---|---|---|
| | A | A | A | A | A | A | A | A | A | A | A | A |
| Drying time (minutes) | 20 | 40 | 83 | 60 | 175 | 130 | 120 | 275 | 265 | 60 | 280 | 230 |
| Catalyzed drying time (minutes) | | | 70 | 30 | 100 | 60 | 52 | 120 | 75 | 60 | 165 | 560 |

The urethan-modified epoxidized oil of Example XIII catalyzed with 1% phosphoric acid was cured by mixture with various amounts of Polycarboxylic Curing Agent B. The mixtures were coated onto standard steel panels previously coated with a 2 mil thickness of commercial alkyd automotive primer. The resin blends were drawn down at 2 mil thickness. The standard drying time and taping time were recorded for these mixtures and tabulated as Examples XIIIB i-iii.

| Example | XIIIBi | XIIIBii | XIIIBiii |
|---|---|---|---|
| Drying time (minutes) | 45 | 90 | 90 |
| Taping time (hours) | 2-3 | 3 | 3-4 |
| Epoxy:curing agent ratio (wt. parts, solids) | 35:65 | 40:60 | 45:55 |

In the ordinary practice of this invention, the urethan-modified component is packaged separately from the polycarboxylic curing agent. A catalyst, such as phosphoric acid, may be used to promote faster curing if desired. These separate components are admixed and applied to a substrate to be coated while in the fluent state. After curing, the resins are resistant to solvents, alkali and acids. Abrasion resistance is high, and gloss retention is good. The clear color of the vehicle is retained for long periods of time. These resins may be colored with the usual pigments, and various fillers, plasticizers, etc. may be added, depending upon the use to which the resins are put.

What is claimed is:
1. A process for making a urethan-modified epoxidized ester prepolymer which comprises:
   (a) reacting an epoxidized ester oil containing at least 2 internal oxirane groups per ester molecule with a monocarboxylic compound containing at least one aliphatic hydroxyl group in sufficient amount to have about 0.05 to 0.5 carboxylic groups per oxirane group, said epoxidized ester oil comprising esterification products of $C_2$–$C_8$ polyols with unsaturated fatty acids having about 12 to 22 carbon atoms per acid moiety and said esterification products having its unsaturation expoxidized equivalent to 3% to 10% oxirane oxygen; and
   (b) reacting the alcohol-treated product of step (a) with an organic polyisocyanate in a ratio to give about 0.2 to 4 isocyanate groups to free hydroxyl group.

2. The process of claim 1 wherein the epoxidized ester oil consists essentially of triglyceride esters of fatty acids having about 2 to 6 internal oxirane groups per ester molecule; wherein the monocarboxylic compound consists essentially of one or more aliphatic compounds having 1–2 primary or secondary hydroxyl groups and having a molecular weight of about 75 to 500; and wherein the ratio of isocyanate groups to free hydroxyl groups (NCO:OH) in step (b) is about 1.3:1 to 1.8:1.

3. The process of claim 2 wherein the monocarboxylic reactant includes a major amount of 2,2-dimethylol propionic acid and the polyisocyanate includes a major amount of toluene diisocyanate.

4. A urethan-modified epoxidized ester consisting essentially of the reaction product of an epoxidized ester of a polyol with $C_{12}$–$C_{22}$ aliphatic acids containing an average of 2–6 internal oxirane groups per ester molecule with a hydroxyl group containing monocarboxylic acid having a molecular weight of about 75 to 500 to produce a hydroxy-modified intermediate ester having at least one unreacted oxirane group per ester molecule; said hydroxy-modified intermediate ester being further reacted with an organic polyisocyanate in a ratio of isocyanate to free hydroxyl groups of about 0.2:1 to 4:1.

5. The urethan-modified epoxidized ester of claim 4 having an oxirane oxygen content of about 3 to 7 wt. percent unreacted polyisocyanate content of less than 2% and wherein the monocarboxylic acid is reacted with an epoxidized triglyceride ester in an amount sufficient to consume about 5 to 50% of the internal oxirane groups.

6. A curable liquid prepolymeric composition comprising the urethan-modified epoxidized ester of claim 4, an organic solvent for the epoxidized ester and 0 to 2% phosphoric acid catalyst, based on the weight of epoxidized ester.

7. A coating system consisting essentially of a cured reaction product of (a) a first package having a curable liquid epoxy resin vehicle which consists essentially of a urethane modified epoxidized ester reaction product of one or more epoxidized triglyceride esters of $C_{12}$–$C_{22}$ aliphatic acids containing an average of about 3% to 10% internal oxirane oxygen with at least one monocarboxylic acid compound having at least one primary or secondary aliphatic alcohol group, said monocarboxylic acid compound being reacted in sufficient amount to consume about 5 to 50% of the internal oxirane groups, the hydroxymodified epoxidized ester being further reacted with an organic polyisocyanate in an NCO:OH ratio of about 1.3:1 to 1.8:1; and (b) a second package having a resin vehicle comprising a polycarboxylic acid curing agent, the proportion of resin vehicles in the two packages being sufficient to produce hard, cured mixtures of the resin vehicles by reaction of the carboxylic acid groups with residual oxirane groups 8. A coating system comprising the reaction product of:
   (a) a first liquid package component comprising a resin vehicle having as its major resin component the urethan-modified epoxidized ester of claim 4; and
   (b) a second liquid package component comprising a polycarboxylic resin curing agent which is the reaction product of a polyol and carboxylic acid anhydride having an acid value of about 60 to 200; the resin components of the packages being in the ratio of about 3:2 to 1:2, based on non-volatile resin solids.

References Cited
UNITED STATES PATENTS

| | | | |
|---|---|---|---|
| 3,404,018 | 10/1968 | Hicks | 260—830 |
| 3,424,766 | 1/1969 | Masters | 260—18 |
| 2,882,249 | 4/1959 | Posnansky | 260—18 |
| 3,549,583 | 12/1970 | Nagata et al. | 260—37 |
| 3,424,719 | 1/1969 | Masters | 260—47 |

FOREIGN PATENTS

| | | | |
|---|---|---|---|
| 6413661 | 5/1966 | Netherlands | 260—18 |

OTHER REFERENCES

Journal of Paint Technology, vol. 39, No. 505, February 1967, pp. 71–77.

DONALD E. CZAJA, Primary Examiner

E. C. RZUCIDLO, Assistant Examiner

U.S. Cl. X.R.

260—18 PF, 18 TN, 32.8 EP, 33.2 EP, 33.4 EP, 33.6 EP, 77.5 AN, 835

UNITED STATES PATENT OFFICE
CERTIFICATE OF CORRECTION

Patent No. 3,699,061      Dated October 17, 1972

Inventor(s) Arthur L. Cunningham

It is certified that error appears in the above-identified patent and that said Letters Patent are hereby corrected as shown below:

Column 5, footnote 2, following the table, insert the numeral -- 7 -- before "hours at 40-55° C.". Column 6, Example XII of second table, "Catalyzed drying time (minutes)", in the last column change "560" to read -- 120 --.

Signed and sealed this 20th day of February 1973.

(SEAL)
Attest:

EDWARD M. FLETCHER, JR.
Attesting Officer

ROBERT GOTTSCHALK
Commissioner of Patents